Patented Mar. 25, 1947

2,417,919

UNITED STATES PATENT OFFICE 2,417,919

SUBSTITUTED NAPHTHOQUINONES AND PROCESSES FOR PRODUCING THE SAME

Louis F. Fieser, Belmont, Mass., assignor to Research Corporation, New York, N. Y., a corporation of New York No Drawing. Application September 11, 1939, Serial No. 294,317

12 Claims. (Cl. 260—396)

This invention relates to a new general process for the synthetic production of substituted 1,4-naphthoquinones having anti-hemorrhagic activity. Of particular importance in this group of substances are the 3-phytyl, 3-geranyl, 3-farnesyl, and 3-cinnamyl derivatives of 2-methyl-1,4-naphthoquinone and the corresponding derivatives of 2-ethyl-1,4-naphthoquinone. 2-methyl-3-phytyl - 1,4 - naphthoquinone indeed corresponds closely in absorption spectrum and other physical properties, as well as in composition, biological activity and color reactions, to the natural vitamin K isolated by other workers from alfalfa extracts.

The compounds to which the present invention applies may be described by the general formula

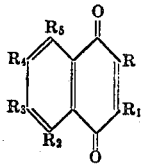

where R is an alkyl or alkenyl radical, $R_1$ is a $\beta$-unsaturated alkenyl group or a benzyl group, and $R_2$, $R_3$, $R_4$, and $R_5$ may be hydrogen or any hydrocarbon radical.

I have found that a great many compounds of this general type can be prepared very satisfactorily by a new process of which the essential step consists in the condensation of a substance such as 2-methyl-1,4-naphthohydroquinone with a diene, a $\beta$-unsaturated alcohol, or a reactive alcohol of the type $ArCH_2OH$, where Ar is an aryl radical. This condensation is brought about by the use of a strong organic acid such as oxalic acid or trichloroacetic acid in a solvent such as dioxane or ethylene glycol monomethyl ether and at temperatures ranging from 70° to 180°, depending upon the reactivity of the diene or alcohol.

I have found, for example, that 2-methyl-1,4-naphthohydroquinone can be condensed with 2,3-dimethylbutadiene in dioxane or ethylene glycol monoethyl ether solution in the presence of anhydrous oxalic acid to give a substituted hydroquinone which can be oxidized by various reagents such as ferric chloride, lead tetraacetate, silver oxide or air to 2-methyl-3-($\beta,\gamma,\gamma$-trimethylallyl)-1,4-naphthoquinone.

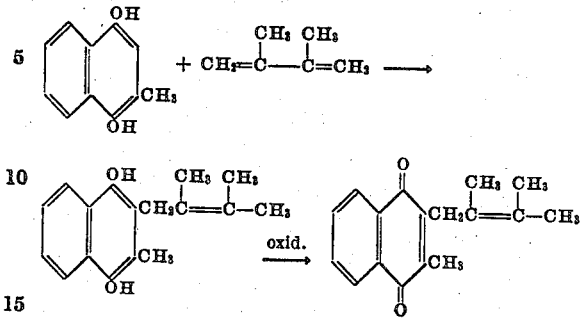

Previous workers have condensed alkyl substituted hydroquinones with dienes and with $\beta$-unsaturated alcohols in the presence of powerful catalysts such as a mineral acid or a halide of zinc, or under conditions where such a reagent is liberated in the course of the initial condensation, with the production of cyclic compounds of the tocopherol type. Numerous examples of this reaction have been reported in the work of Lee I. Smith, Karrer, Todd, John, and others. My invention differs from those described by these investigators in that I have been able for the first time to bring about the condensation as a separate step and without concomitant cyclization. By the use of milder condensing agents, such as strong organic acids, and employing suitable conditions of solvent, temperature, and concentration, I have been able to prepare substituted hydroquinones containing a $\beta$-unsaturated side chain adjacent to one phenolic hydroxyl group and to avoid cyclization to a tocopherol.

Considerable variation is possible in the nature of both components and in the conditions of reaction, as shown in the following examples, but of course certain components react better than others and the conditions are advantageously adjusted to meet the specific requirements of each case. Thus 2-methyl-1,4-naphthoquinone reacts more readily than the 2-ethyl homologue, 2,3-dimethyl-butadiene condenses more smoothly than isoprene, geraniol gives a better yield of the reaction product than myrcene, and benzyl and cinnamyl alcohols enter more readily into the reaction than allyl alcohol.

Among other important cases, my invention relates to the condensation of 2-methyl-1,4-naphthohydroquinone with phytol, and the general procedure applies particularly to the isolation of 2-methyl-3-phytyl-1,4-naphthohydroquinone from the reaction mixture and its oxidation to the corresponding quinone, which is a powerfully active anti-hemorrhagic agent. I have found that unchanged starting

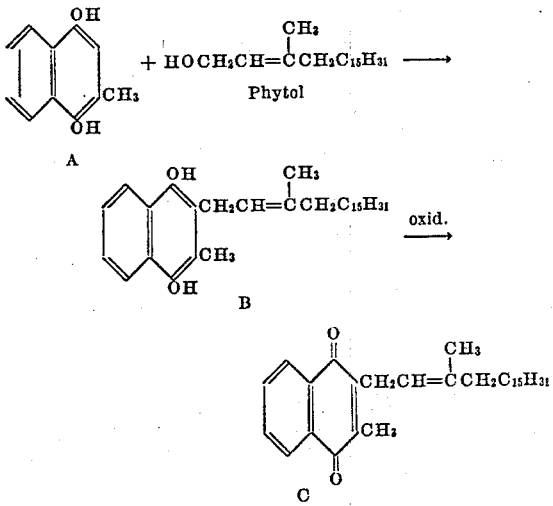

material (A) can be removed completely from the reaction by extraction from ether with alkaline hydrosulfite solution, in which the substituted hydroquinone B is very sparingly soluble. The reaction product B is then separated from the dark reaction mixture by virtue of its sparing solubility in petroleum ether. Impurities and by-products are removed easily by centrifugation, and a solution of B in ether can then be oxidized readily to the quinone C, which is obtained in a very pure form as a yellow oil by simple evaporation of the solvent.

The following examples are presented in illustration of the principal features of my invention. Many other variations falling within the scope and spirit of my discovery can clearly be made, and it should be understood that the examples given merely typify the nature of the new synthetic method which I have discovered.

*Examples*

(1) *2-methyl - 3 - (β,γ,γ - trimethylallyl) - 1,4 - naphthoquinone (I)*.—A solution of 3 g. of 2-methyl-1,4-naphthohydroquinone, 3 g. of anhydrous oxalic acid, 10 cc. of 2,3-dimethylbutadiene, and 30 cc. of dioxane is refluxed for 24 hrs., diluted with water and extracted with ether. After washing twice with water the ethereal layer is shaken with a freshly prepared solution of 1–2 g. of sodium hydrosulfite in 100 cc. of 1% sodium hydroxide. Any quinone formed by oxidation is thereby reduced, and a trace of unchanged methylnaphthohydroquinone is removed. [The substituted hydroquinone can be separated from the reaction mixture by repeated extraction at this point with 2–10% alkali containing hydrosulfite but it is more easily isolated by the following process.]

The washed ethereal solution is dried with magnesium sulfate or sodium sulfate and the solvent evaporated, eventually under vacuum. On rubbing the residual oil with petroleum ether the hydroquinone of I separates as a nearly colorless solid, which when washed with petroleum ether and dried weighs 1.19 g. This substance sinters at about 110° and melts with decomposition at about 120°, and it is easily oxidized on exposure to air.

For oxidation, 0.23 g. of the crude hydroquinone in 2 cc. of alcohol is treated with a solution of 0.49 g. of ferric chloride in dilute hydrochloric acid, or the same amount of material in acetic acid is treated with 0.4 g. of lead tetraacetate in acetic acid. In either case oxidation occurs at once and on dilution with a little water the quinone I separates in glistening, bright yellow blades, M. P. 95–95.5°; yield: 0.18–0.22 g.

Anal.: Calcd. for $C_{17}H_{18}O_2$: C, 80.28; H, 7.14. Found: C, 80.33; H, 7.25.

The quinone is readily soluble in ligroin or alcohol. On treatment with acetic anhydride (4 parts), zinc dust (1 part), and pyridine (1 part) in the cold it is converted into the hydroquinone diacetate, which crystallizes from ligroin as colorless cubes, M. P. 119–120°.

Anal.: Calcd. for $C_{21}H_{24}O_4$: C, 74.09; H, 7.11. Found: C, 74.04; H, 7.23.

Ethylene glycol monomethyl ether can be used as the solvent in the preparation when the condensation is conducted as described except for the substitution of this solvent for dioxane (and regulating the temperature to 75°). The yield of the quinone I is 0.25 g.

(2) *2-methyl-3-cinnamyl-1,4-naphthoquinone (II)*.—A solution of 3 g. of 2-methylnaphthohydroquinone, 1.54 g. of cinnamyl alcohol and 2 g. of anhydrous oxalic acid is refluxed for 22 hrs. and the cooled solution is poured into water and the mixture extracted with ether. Unchanged methyl naphthohydroquinone is removed by extraction of the ethereal solution with 150 cc. of 1% sodium hydroxide containing hydrosulfite, the yellow alkaline liquor being run into dilute acetic acid and the precipitate collected after cooling and identified by oxidation with ferric chloride (5 g.) in dilute alcohol to 2-methyl-1,4-naphthoquinone, M. P. 100–103°. The ethereal solution is dried and evaporated in vacuo and the residue stirred with three 80-cc. portions of petroleum ether, separating the solvent by decantation. This leaves 1.55 g. of the substituted hydroquinone as a grey solid. It is dissolved in absolute ether and the solution shaken with 5 g. of silver oxide in the presence of anhydrous sodium sulfate. The filtered yellow solution on evaporation gives the quinone II as a yellow solid which for purification is crystallized from ether-petroleum ether and gives 0.8 g. (24%) of pure 2-methyl-3-cinnamyl-1,4-naphthoquinone, M. P. 124–126°. Recrystallized from ethanol the compound forms bright yellow blades, M. P. 127–127.5°.

Anal.: Calcd. for $C_{20}H_{16}O_2$: C, 83.31; H, 5.59. Found: C, 83.63; H, 5.71.

The quinone gives a beautiful intense blue color with alcoholic alkali which fades in about fifteen minutes to brown. Reductive acetylation as in Example 1 gives the hydroquinone diacetate which forms fine silky needles from ether-petroleum ether, M. P. 167.5–168°.

Anal.: Calcd. for $C_{24}H_{22}O_4$: C, 76.98; H, 5.92. Found: C, 77.17; H, 6.09.

The methyl cinnamyl naphthohydroquinone can also be separated from the reaction mixture by extraction from ether with a large volume of sodium hydroxide-hydrosulfite.

The quinone II can be prepared alternately by substituting trichloro acetic acid for oxalic acid as a condensing agent in the above procedure. The reaction product is extracted, for example, from the ethereal solution with five 25-cc. portions of 1% sodium hydroxide containing hydrosulfite, the remaining steps being conducted as above.

(3) *2-ethyl-3-cinnamyl - 1,4 - naphthoquinone (III)*.—2-ethyl-1,4-naphthohydroquinone (3 g.) is condensed with cinnamyl alcohol (1.54 g.) using oxalic acid (2 g.) in dioxane (20 cc.) exactly as in Example 2. In this case the substituted hydroquinone is best extracted from the ethereal solution with dilute alkali after a first washing to remove unchanged starting material (1.68 g.). The alkaline extracts are run into a separatory funnel containing ether and after acidification with acetic acid the product is extracted with ether and oxidized with silver oxide and magnesium sulfate. The yellow residue is purified by crystallization from ethanol, yielding 0.1 g. of flat needles of the quinone, M. P. 118–118.5°.

Anal.: Calcd. for $C_{21}H_{18}O_2$: C, 83.41; H, 6.00. Found: C, 83.29; H, 6.10.

The hydroquinone diacetate forms long prisms from ether-petroleum ether, M. P. 123.5–124.5°.

Anal.: Calcd. for $C_{25}H_{24}O_4$: C, 77.30; H, 6.23. Found: C, 77.23; H, 6.34.

(4) *2-methyl-3-benzyl - 1,4 - naphthoquinone (IV)*.—After refluxing for 25 hrs. a mixture of 2.0 g. of methyl-naphthohydroquinone, 1.24 g. of benzyl alcohol, 2 g. of anhydrous oxalic acid and 20 cc. of dioxane the solution was poured into water and extracted with ether. Extraction of the ethereal solution with 1% alkali-hydrosulfite removes the starting material after which the benzyl derivative is extracted with three 25-cc. portions of 10% alkali. The alkaline liquor is acidified and the product extracted with ether, collected as a solid and oxidized with ferric chloride. The resulting quinone, which is obtained under these conditions in rather poor yield, may be purified by crystallization from dilute alcohol or from ether-petroleum ether and obtained as clusters of feathery needles, M. P. 107.5–108°.

Anal.: Calcd. for $C_{18}H_{14}O_2$: C, 82.41; H, 5.38. Found: C, 82.50; H, 5.42.

(5) *2-methyl-3-(γ,γ-dimethylallyl) - 1,4-naphthoquinone (V)*.—This is obtained in small amounts by condensing 2 g. of methylnaphthohydroquinone and 2 g. of isoprene with 2 g. of oxalic acid in 20 cc. of dioxane in a sealed tube at 180° for 15 hrs. The mixture is worked up and the quinone collected exactly as described in Example 4 and for identification and characterization the yellow oily product is reduced with zinc dust and sodium acetate in the presence of acetic anhydride and thus converted into the hydroquinone diacetate. This crystallizes from ether-hexane in colorless prisms, M. P. 104.5–105.5°. The yield is 0.1 g.

Anal.: Calcd. for $C_{20}H_{22}O_4$: C, 73.60; H, 6.80. Found: C, 73.52; H, 6.79.

(6) *2-methyl-3-phytyl - 1,4 - naphthoquinone (VI)*.—In a typical preparation a solution is prepared from 5 g. of 2-methylnaphthohydroquinone, 1 g. of anhydrous oxalic acid, 1.48 g. of phytol and 15 cc. of dioxane purified by distillation over sodium. The solution is heated in a closed vessel with a thermometer in the liquid and the temperature is maintained at or near 75° throughout the course of the reaction which is continued for from 18–40 hrs., the best results being obtained with a reaction time of about 34 hrs. The red solution is washed into a separatory funnel with ether, diluted with water and extracted two or three times with water. The resulting ethereal solution thus obtained is then extracted with successive portions of 2% potassium hydroxide solution in which sodium hydrosulfite is dissolved just before use (1–2 g. per 100 cc.). The yellow alkaline extracts are run directly into a separatory funnel containing a little ether to protect the hydroquinone from oxidation. After extracting the alkaline liquor with ether it is run into another separatory funnel containing ether and sufficient acetic acid for neutralization. The liberated methylnaphthohydroquinone is extracted with ether and after drying and evaporating the solvent it is obtained as a nearly colorless solid and in a condition satisfactory for use in another run. The recovered material amounts to 3.51–3.72 g.

After the alkaline liquors are no longer yellow the ethereal solution is extracted twice more with 2% alkali and then separated, dried and evaporated, eventually in vacuum. This gives 1.9–2.0 g. of a rather waxy brown oil containing the desired methylphytylnapthohydroquinone together with unchanged phytol, possibly phytadiene and probably some of the napthotocopherol. It is rubbed with 30–50 cc. of petroleum ether (B. P. 20–40°) and thus obtained as a somewhat waxy, gelatinous white solid. This is not easily separated by filtration but can be collected in a satisfactory condition by centrifugation. The hydroquinone is somewhat soluble in petroleum ether and so before centrifuging the pasty mixture is cooled well in an ice bath. On centrifugation the substance settles as a white sludge and this is stirred to a thin paste with a further portion of petroleum ether, cooled and again centrifuged. This process is repeated if colored impurities are still present. The combined petroleum ether solutions on evaporation give about 1.5 g. of residual brown oil. The white paste of the hydroquinone is dissolved in dry ether and oxidation to the quinone is accomplished either by shaking the solution with air or by adding an excess of silver oxide (1 g.) and anhydrous magnesium sulfate. In either case the clear yellow filtered solution is then evaporated, removing the last traces of solvent in vacuum. The residue is a pure yellow, heavy but rather mobile oil and consists of very pure 2-methyl - 3 - phytyl - 1,4 - naphthohydroquinone, The yield is 0.60–0.65 g.

Anal.: Calcd. for $C_{31}H_{46}O_2$: C, 82.61; H, 10.29. Found: C, 82.76; H, 10.53.

The quinone gives striking purple or blue solutions when treated in methanol or ethanol with alcoholic sodium or potassium hydroxide, the shade and depth of color depending upon the concentrations. In any case the purple-blue color fades within a short time and eventually gives a dull red. The quinone has a characteristic ultraviolet absorption spectrum with maxima at 241, 248, 261, 271, and 328 mu. The pure quinone gives a clear yellow solution in ether which is completely discharged on shaking with sodium hydrosulfite solution. Bio-assays with chicks on a vitamin-K deficient diet and showing a blood clotting time of 2 hrs. indicate that the synthetic quinone in dose of 2–4 γ has an antihemorrhagic activity equivalent to about 75 mg. of standard alfalfa.

For reductive acetylation 0.5 g. of the quinone VI is suspended in 5 cc. of acetic anhydride and treated with 0.5 g. of zinc dust and then, while cooling in ice, with 5 drops of pyridine. The mixture is stirred with cooling for a few minutes until the oily quinone has passed into solution and then allowed to stand for 1 hour. Acetic acid is added and the solution is filtered, diluted with water and the product extracted with ether. After washing with dilute acid and with dilute alkali the solution is dried and evaporated, giving a nearly colorless oil. This crystallizes slowly from methanol to give 2-methyl-3-phytyl-1,4-diacetoxynaphthalene in the form of colorless microneedles, M. P. 57–59°.

Anal.: Calcd. for $C_{35}H_{52}O_4$: C, 78.31; H, 9.77. Found: C, 78.34; H, 9.87.

The hydroquinone dibenzoate is prepared similarly using zinc dust, benzoyl chloride and pyridine and it crystallizes from methanol as white waxy nodules, M. P. 85–86°.

Anal.: Calcd. for $C_{45}H_{56}O_4$: C, 81.77; H, 8.54. Found: C, 81.63; H, 8.59.

The above procedure can be varied by substitution of 1 g. of trichloroacetic acid for 1 g. of oxalic acid as a condensing agent; after a reaction period of 24 hrs. at 75°, for example, the yield is 0.53 g. The amount of condensing agent, at least in the case of anhydrous oxalic acid, can be tripled without influencing the yield. The reaction proceeds equally well in the presence of magnesium sulfate or on exposure to bright sunlight in a Pyrex flask. The temperature must not be too low (50°) or no reaction occurs and if too high a temperature is used the reaction product undergoes cyclization. A large excess of methylnaphthothydroquinone is advisable for with only one equivalent (0.86 g.) the yield drops to 0.1–0.2 g. An excessive reaction time is to be avoided; for example if the reaction is conducted exactly as described but continued for 69 hrs. the yield drops to 0.4 g.

(7) *2,6-dimethyl - 3 - phytyl - 1,4 - naphthoquinone. VII.*—This is prepared by the exact procedure of Example 6. Thus 4 g. of 2,6-dimethyl-1,4-naphthohydroquinone, 1.5 g. of phytol, and 1 g. of anhydrous oxalic acid are dissolved in 15 cc. of dioxane and heated to 70–80° for 24 hrs. On separating the substituted hydroquinone from the reaction mixture by virtue of its insolubility in petroleum ether, and oxidation as above there is obtained 0.59 g. of pure quinone VII as a yellow oil.

Anal.: Calcd. for $C_{32}H_{48}O_2$; C, 82.70; H, 10.41. Found: C, 82.53; H. 10.44.

The substance gives a purple-blue color test with alcoholic alkali and the spectrum corresponds very closely to that of VI. The hydroquinone diacetate forms colorless crystal clumps, M. P. 55–56.6°.

Anal.: Calcd. for $C_{36}H_{54}O_4$: C, 78.50; H, 9.88. Found: C, 78.84; H, 9.74.

(8) *2 - methyl-3-geranyl - 1,4 - napthoquinone. VIII.*—The preparation is conducted as in Exampe 6, using 2 g. of 2-methylnapthohydroquinone, 1 g. of oxalic acid, 1.13 g. of geraniol and 10 cc. of dioxane heated for 24 hrs. at 84°. The only difference in this case is that the substituted hydroquinone separates from petroleum ether in such a gelatinous condition that the complete removal of impurities is difficult even on repeated centrifugation. The quinone is obtained as a yellow oil, yield being 0.26 g. The properties are similar to those of Examples 6 and 7 and the color reaction is as described for the other compounds.

Anal.: Calcd. for $C_{21}H_{24}O_2$; C, 81.78; H, 7.85. Found: C, 81.22; H, 8.01.

A quinone, probably identical with that just described, is obtained by substituting 1 g. of myrcene for the geraniol in the above preparation. The yield in this case is somewhat less (79 mg.).

Anal.: Calcd. for $C_{21}H_{24}O_2$: C, 81.78; H, 7.85. Found: C, 81.24; H, 7.99.

I claim as my invention:

1. In a process for the production of substituted 1,4-naphthoquinones the step which consists in condensing a 1,4-naphthohydroquinone with a compound of the group consisting of open chain aliphatic hydrocarbon dienes, open chain unsubstituted aliphatic β-unsaturated alcohols and reactive alcohols of the type $ArCH_2OH$ in which Ar is an aryl radical, with the aid of an acid having an acid strength substantially within the range from that of oxalic acid to that of trichloroacetic acid and in the presence of an inert solvent for the reactants and the acid at a temperature of from about 70° C. to 180° C.

2. The step in the process for the production of substituted 1,4-naphthoquinones as defined in claim 1 in which the 1,4-naphthohydroquinone is a C-alkyl substituted 1,4-naphthohydroquinone.

3. The step in the process for the production of substituted 1,4-naphthoquinones as defined in claim 1 in which the 1,4-naphthohydroquinone is a 2-methyl-1,4-naphthohydroquinone.

4. The step in the process for the production of substituted 1,4-naphthoquinones as defined in claim 1 in which the acid is oxalic acid.

5. The step in the process for the production of substituted 1,4-naphthoquinones as defined in claim 1 in which the acid is trichloracetic acid.

6. The step in the process for the production of substitued 1,4-naphthoquinones as defined in claim 1 in which the solvent is dioxane.

7. The step in the process for the production of substituted 1,4-naphthoquinones as defined in claim 1 in which the solvent is ethylene glycol monomethyl ether.

8. The step in the process for the production of substituted 1,4-naphthoquinones as defined in claim 1 in which 2-methyl-1,4-naphthohydroquinone is condensed with phytol.

9. The step in the process for the production of substituted 1,4-naphthoquinones as defined in claim 1 in which 2-methyl-1,4-naphthohydroquinone is condensed with phytadiene.

10. A compound of the general formula

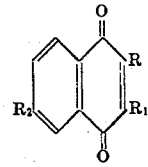

in which R is a lower alkyl group, $R_2$ is a member of the group consisting of hydrogen and the lower alkyl groups and $R_1$ is an open chain unsubstituted hydrocarbon group having a double bond in β position of the group consisting og geranyl and farnesyl.

11. 2-methyl-3-geranyl-1,4-naphthoquinone.
12. 2-methyl-3-farnesyl-1,4-naphthoquinone.

LOUIS F. FIESER.

REFERENCES CITED

The following references are of record in the file of this patent:

Fieser et al. in "Jour. Am. Chem. Soc.," 1934, vol. 56.

Groves in "Liebigs Annalen.," vol. 167, p. 359.

Fieser, "Jour. Am. Chem. Soc.," vol. 57, pp. 1479–82 (1935).